(12) United States Patent
Dercar et al.

(10) Patent No.: US 11,678,772 B2
(45) Date of Patent: Jun. 20, 2023

(54) HEAT MANAGEMENT FOR FOOD PROCESSOR

(71) Applicant: NESTEC S.A., Vevey (CH)

(72) Inventors: Heinz Dercar, Vienna (AT); Bertrand Guyon, Saint Point Lac (FR); Alessandro Molinaro, Lausanne (CH); Johan Nieuwendijk, Vienna (AT); Wolfgang Tuider, Oberwart (AT)

(73) Assignee: Societe des Produits Nestle S.A., Vevey (CH)

( * ) Notice: Subject to any disclaimer, the term of this patent is extended or adjusted under 35 U.S.C. 154(b) by 1054 days.

(21) Appl. No.: 16/462,713

(22) PCT Filed: Dec. 11, 2017

(86) PCT No.: PCT/EP2017/082212
§ 371 (c)(1),
(2) Date: May 21, 2019

(87) PCT Pub. No.: WO2018/108808
PCT Pub. Date: Jun. 21, 2018

(65) Prior Publication Data
US 2020/0077841 A1    Mar. 12, 2020

(30) Foreign Application Priority Data
Dec. 13, 2016 (EP) ..................... 16203740

(51) Int. Cl.
*A47J 43/00* (2006.01)
*A47J 43/046* (2006.01)
*A47J 43/08* (2006.01)
*B01F 33/453* (2022.01)
*B01F 101/07* (2022.01)

(52) U.S. Cl.
CPC ......... *A47J 43/0465* (2013.01); *A47J 43/085* (2013.01); *B01F 33/453* (2022.01); *B01F 2101/07* (2022.01)

(58) Field of Classification Search
CPC ............................ A47J 43/0465; A47J 43/085
See application file for complete search history.

(56) References Cited

U.S. PATENT DOCUMENTS 5,273,358 A * 12/1993 Byrne ...................... H02K 5/20
366/205
6,318,247 B1  11/2001 Di Nunzio et al.
6,499,873 B1  12/2002 Chen
(Continued)

FOREIGN PATENT DOCUMENTS

DE   202004011552     9/2004
JP      2015228891 A  12/2015

*Primary Examiner* — Anshu Bhatia
(74) *Attorney, Agent, or Firm* — K&L Gates LLP

(57) ABSTRACT

A machine (1) for processing a liquid food substance incorporates: a container (10) delimiting a cavity (10') for containing said liquid food substance; an impeller (20) for driving the liquid food substance in the container (10); a motor (30) for driving the impeller (20); a motor chamber (40) for containing the motor (30); and a means for evacuating heat from the motor chamber (40). Such means comprises one or more movable members (50) that are driven by the motor (30) and that are configured to circulate air (2a,2b) in the motor chamber (40) to evacuate heat therefrom.

16 Claims, 2 Drawing Sheets

(56) References Cited

U.S. PATENT DOCUMENTS

| | | |
|---|---|---|
| 8,875,618 B2 | 11/2014 | Boussemart et al. |
| 2003/0197080 A1 | 10/2003 | Karkos, Jr. et al. |
| 2014/0241109 A1* | 8/2014 | Paget .................... A47J 43/046 366/205 |
| 2015/0117139 A1 | 4/2015 | Conti et al. |

* cited by examiner

HEAT MANAGEMENT FOR FOOD PROCESSOR

CROSS REFERENCE TO RELATED APPLICATIONS

The present application is a National Stage of International Application No. PCT/EP2017/082212, filed on Dec. 11, 2017, which claims priority to European Patent Application No. 16203740.2, filed on Dec. 13, 2016, the entire contents of which are being incorporated herein by reference.

FIELD OF THE INVENTION

The field of the invention pertains to machines for heating a food substance, such as milk or a milk-containing substance. For instance, the machine is provided with an impeller and a heat management arrangement.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

An architecture to favour the evacuation of unwanted heat generated by the operation of electric components of the milk frothing appliance has been disclosed in PCT/EP16/063668.

SUMMARY OF THE INVENTION

It is a preferred object of the present invention to provide a machine for heating a food substance which provides a more reliable heat management configuration.

The invention thus relates to a machine for processing a liquid food substance, such as milk or a milk-based substance. The liquid food substance can be aqueous, e.g. containing coffee and/or chocolate and/or cacao.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat milk and optionally be associated, as a standalone machine or as an integrated machine, into a coffee maker. Standalone and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into the milk, it may include an operating mode without incorporation of gas bubbles.

The machine of the invention comprises: a container delimiting a cavity for containing the liquid food substance, such as a container provided with a removable lid for covering the cavity; an impeller for driving the liquid food substance in the container; a motor for driving the impeller; a motor chamber for containing the motor, and optionally further components such as a control unit and/or a thermal conditioner e.g. a heater and/or a cooler; and a means for evacuating heat from the motor chamber.

The container may have a side wall and a bottom wall for delimiting its cavity.

The container may have a lid to cover the cavity, e.g. as taught in WO 2008/142154.

The container can be generally cup-shaped or bowl-shaped or cylinder-shaped, the sidewall being generally upright and the bottom wall being generally flat or curved.

The container can be provided with a thermally insulating outside material and/or with a handle, for seizure and optional displacement of the container by a human hand. Such a configuration is particularly advantageous when the food is processed at a higher temperature exceeding e.g. 50° C. or below 10° C.

The heat evacuation means comprises one or more movable members that are driven by the motor and that are configured to circulate air in the motor chamber to evacuate heat therefrom.

For instance, the heat evacuation means is configured to evacuate heat by the circulated air from the motor chamber out of such machine predominantly via one or more passages separate from the cavity. The heat evacuation means can be configured so that a ratio of the heat evacuated by the passages over the heat evacuated by the cavity is greater than 2.5, such as greater than 5, for example greater than 10, e.g. greater than 30.

By providing a preferential heat evacuation path to minimise a transfer of such heat into the container, the temperature in the container originates mainly from the thermal conditioner (if any) and is not or only insignificantly influenced by the unwanted heat generated within the motor chamber, e.g. generated by the motor and/or other electrical devices. Indeed such unwanted heat is predominantly evacuated by the heat evacuation means to outside the machine without passing via the container.

It follows that the same motor drives on the one hand the machine's impeller and on the other hand the movable members of the heat evacuation means. Hence, the action of the heat evacuation means can be easily arranged to follow an increase or decrease of the action of the motor and thus an increase or decrease of power consumed by the motor.

The heat evacuation means may include a further arrangement for evacuating heat, e.g. as disclosed in PCT/EP16/063668. For example, the heat evacuation means includes a radiator, a dissipator, e.g. a ventilator, and/or a heat sink.

The machine can have a heater for heating the liquid food substance.

The machine can include a control unit for controlling the processing of the liquid food substance, such as for controlling the motor of the impeller. The control unit may be used to control the thermal conditioner, e.g. heater and/or cooler, when present.

For example, the control unit is configured to control the heater for:
carrying out different heating profiles over time and/or for carrying out one or more heating profiles of constant or variable heating; and/or
disabling the heater and optionally activating a cooler (if present) for a constant or variable cooling of the liquid food substance.

The motor chamber may have at least one opening for an exchange of air driven by the movable member(s) between the chamber and a space outside the chamber, e.g. a space outside such machine.

The motor chamber can have one or more air inlet openings for letting air into the chamber and one or more air outlet openings for letting air out of the chamber when the one or more movable members are driven by the motor. Such openings can be located on a machine external bottom face and/or machine external side face(s).

Such openings or other parts of the motor chamber can be formed as a radiator or a heat sink to contribute to the evacuation of heat from the chamber.

At least one of the air circulation member(s) can be formed as a wing, blade or vane.

At least one of the air circulation member(s) may have:
a generally arched or curved shape, such as the general shape of an angular section of a cylindrical, conical, spherical, elliptoidal, helicoidal shape; and/or
a generally straight shape formed of a single planar section or a plurality of angled planar sections, optionally at least one planar section(s), e.g. all planar sections, having a (non-zero) angle relative to a direction of motion of the circulation member.

The air circulation member(s) may be mounted on an axle driven by the motor, such as on a motor's output shaft or an axle driven thereby, e.g. driven via a transmission by the output shaft such as via a gear transmission e.g. a toothed gear transmission.

The air circulation member(s) and the impeller may be driven at a same rotational speed by the motor or at different rotational speeds. For instance, a gear arrangement transmits a rotational speed from the motor to the air circulation member(s) at a first transmission ratio and to the impeller at a second transmission ratio different to the first transmission ratio. The first transmission ratio may be greater or smaller than the second transmission ratio. Whether it is greater of smaller and to which extent it is greater or smaller, may be based on the desired rotational speed of the impeller in the container (e.g. depending on the shape of the impeller and the desired result of the liquid food processing) on the one hand and the desired rotational speed of the air circulation member(s) (e.g. depending on the shape, movement path and number of the air circulation member(s) and desired air flow in the motor chamber).

A plurality of air circulation members can be mounted in a loop, e.g. in a circle, such as on a ring or a disc, about a rotation axis, optionally the air circulation members being generally evenly distributed along the loop.

For example, the air circulation members are arranged for form a fan driven by the motor.

The motor chamber may have a generally centrally located axis and peripheral sidewall(s), the air circulation member(s) being driven by the motor in the motor chamber about the centrally located axis, between the centrally located and the sidewalls, such as at a distance from the centrally located axis in the range of ¼ to ¾ of the spacing from the centrally located axis to the sidewall at the level of the air circulation member, e.g. at a distance in the range of ⅓ to ⅔ of such spacing.

The motor may drive a drive member, such as a coupling member having a general shape of a ring or a disc and/or a coupling member bearing at least one of the air circulation member(s), for driving the impeller in the container.

The drive member can incorporate one or more magnetic elements cooperating with magnetic elements of the impeller so as to drive the impeller magnetically via a wall, such as a bottom wall and/or a sidewall, of the container. For instance, the magnetic members driving the impeller via a wall of the chamber, such as a platform wall and/or a sidewall.

At least one magnetic element of the drive member may be a magnetic field-generating element that is arranged to be magnetically coupled to a corresponding ferromagnetic element of the impeller.

At least one magnetic element of the drive member may be a ferromagnetic element that is arranged to be magnetically coupled to a corresponding magnetic field-generating element of the impeller.

At least one magnetic element of the drive member can be a magnetic field-generating element that is arranged to be magnetically coupled to a corresponding magnetic field-generating element of the impeller.

Such magnetic field-generating element(s) may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Such ferromagnetic element(s) can be made of at least one of Co, Fe, $Fe_2O_3$, $FeOFe_2O_3$, $NiOFe_2O_3$, $CuOFe_2O_3$, $MgO\ Fe_2O_3$, $Nd_2Fe_{14}B$, Mn, Bi, Ni, MnSb, $MnOFe_2O_3$, $Y_3FesO_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, SmCos, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The magnetic coupling of the impeller, e.g. of a low inertia impeller, can be achieved as taught in WO 2006/050900 or in WO 2008/142154.

The magnetic coupling of the impeller, e.g. of a high inertia impeller, may be achieved as taught in PCT/EP16/063664.

When a high transmission torque is transmitted to the impeller via a magnetic coupling (i.e. a strong coupling), a magnetic uncoupling arrangement may be provided, e.g. as taught in PCT/EP16/063665.

To facilitate the movement of the impeller, if and when in contact with a container support surface, e.g. a bottom of the container, an arrangement as taught in PCT/EP16/063666 may be implemented.

Alternatively, the impeller may be driven by the motor via a mechanical transmission extending from the motor chamber into the cavity, such as a mechanical transmission extending from the motor to the impeller for an uninterrupted mechanical transmission between the motor and the impeller.

The machine of the invention may include a base, e.g. an electrically connected base such as a base connected electrically to the mains via an electric cord, and a receptacle containing the container, e.g. a receptacle having a handle. For instance, the receptacle is connectable to the base for processing the liquid food substance and separable from the base for dispensing the food substance upon processing and/or for cleaning the receptacle.

In one embodiment, the base may contain the motor chamber. In another embodiment, the motor is included in the receptacle, the base forming an electric connector for powering the motor.

In an embodiment, the receptacle is made of passive components whereas the base comprises the active components, for example the motor, a control unit and/or a thermal conditioner such as a heater and/or a cooler, e.g. a radiant or inductive thermal conditioner. The base may form a nest for receiving the receptacle.

The container may be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

The container may be electrically passive. Hence, beyond the inherent electric properties of the materials making its structure for containing the food substance and for being integrated or assembled in the machine, the container may be free of any electric active parts such as an electric circuit of discrete or integrated components (e.g. resistors, inductances, transistors, . . . ) that require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

The impeller may include a surface for imparting a mechanical effect to the liquid food substance, such as for mixing the liquid food substance with another fluid, e.g. air.

For example, the impeller has a spring-like structure of the type disclosed in WO 2006/050900 or in WO 2008/142154 and/or the impeller has a wavy and/or open disc-shaped structure as taught in PCT/EP16/063667.

The impeller can have a foot for being connected to the motor, e.g. via magnetic elements in the foot.

The impeller can include an axle extending towards a mouth of the container when the impeller is driven by the motor, e.g. an axle extending to the level of the mouth, such as an axle that is seizable by a user for removing the impeller from the container.

BRIEF DESCRIPTION OF THE DRAWINGS

The invention will now be described with reference to the schematic drawings, wherein.

DETAILED DESCRIPTION

Figure 1:
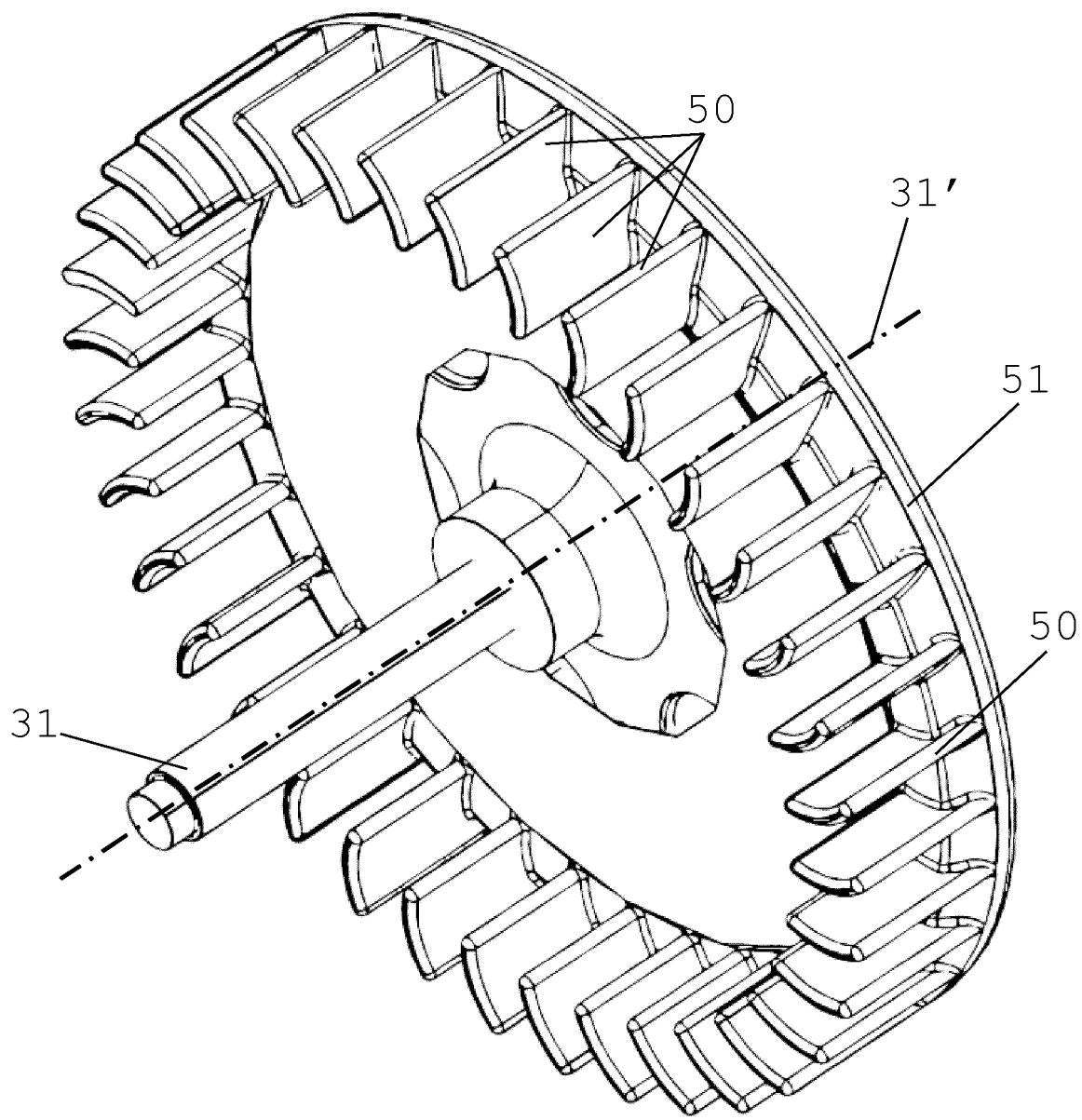
FIG. 1 is a perspective view of a series of movable members for evacuating heat from a motor chamber of an example of a machine according to the invention.
Figure 2:
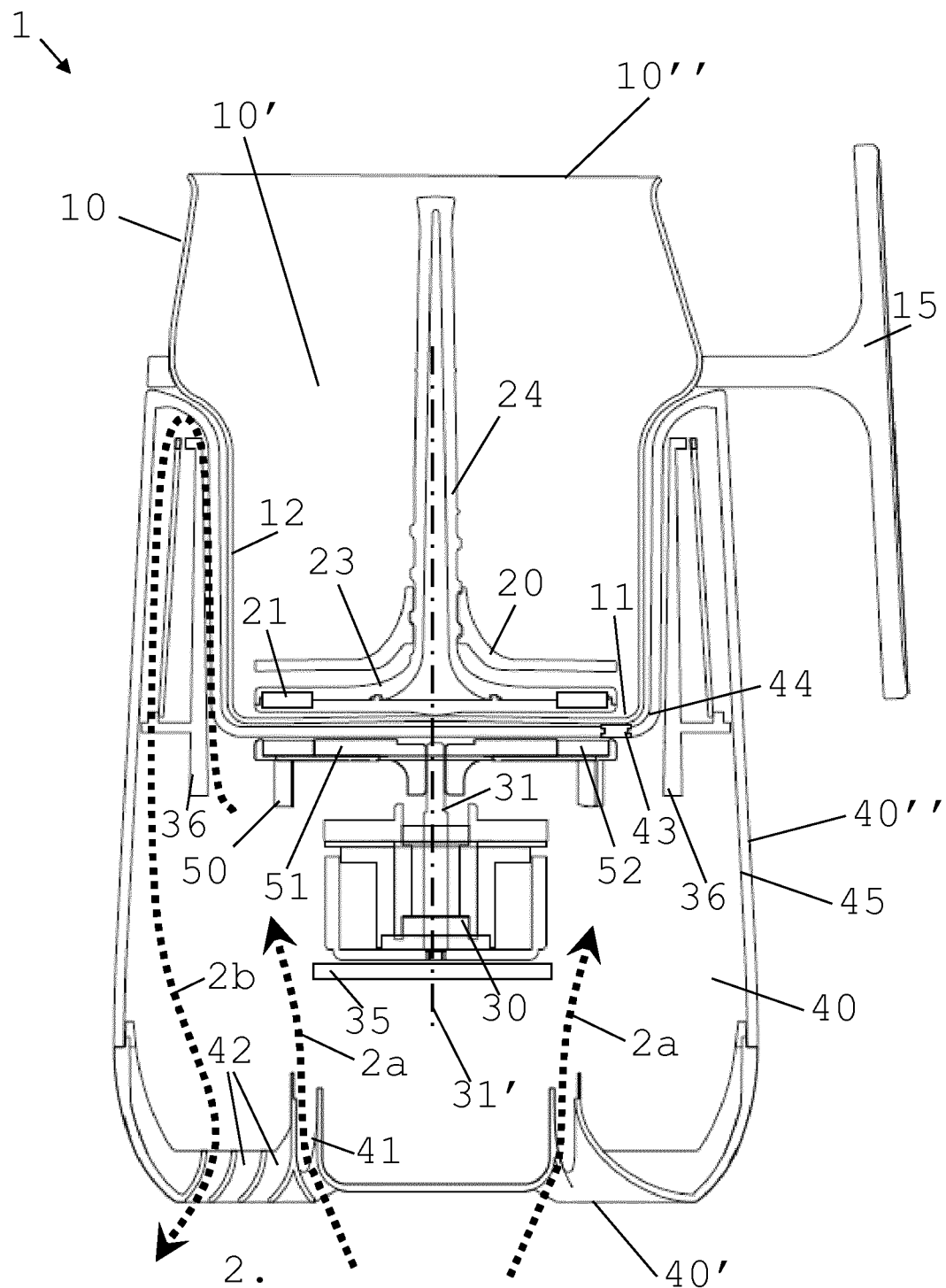
FIG. 2 is a cross-sectional view of a machine according to the invention incorporating the movable members shown in FIG. 1.

An example of a machine 1 for processing a liquid food substance, such as milk or a milk-based substance, is illustrated in FIG. 2. An example of an arrangement of movable heat evacuating members 50 for such a machine 1 is shown in FIG. 1. Whereas the arrangement is shown in FIG. 1 with a plurality of movable members 10, the principle of the invention applies to arrangements with any number of movable members, even to an arrangement with only one movable member.

Machine 1 has: a container 10 delimiting a cavity 10' for containing the liquid food substance, container can be fitted with a removable lid (not shown) for covering the cavity 10'; an impeller 20 for driving the liquid food substance in the container 10; a motor 30 for driving impeller 20; a motor chamber 40 for containing the motor 30, and optionally further components such as a control unit 35 and/or a thermal conditioner 36 e.g. a heater and/or a cooler; and a means for evacuating heat from motor chamber 40.

The heat evacuation means comprises one or more movable members 50 that are driven by motor 30 and that are configured to circulate air 2a,2b in the motor chamber 40 to evacuate heat therefrom.

The heat evacuation means may be configured to evacuate heat by the circulated air from motor chamber 40 out of such machine 1 predominantly via one or more passages 40,41,42 separate from cavity 10'.

A complete air circulation from the air intake 2a to the air outflow 2b is illustrated on the left-hand side of FIG. 2. Only the air intake 2a is illustrated on the right-hand side of FIG. 2. Such air circulation may of course take place at selected places in motor chamber 40 or substantially in the entire chamber 40.

The heat evacuation means can be configured so that a ratio of the heat evacuated by such passages 40,41,42 over the heat evacuated by the cavity 10' is greater than 2.5, such as greater than 5, for example greater than 10, e.g. greater than 30.

Motor chamber 40 can have at least one opening 41,42 for an exchange of air 2a,2b driven by the movable members 50 between chamber 40 and a space 2 outside the chamber 40, e.g. a space 2 outside such machine 1.

Openings 41,42 or other parts of chamber 40 can be formed as radiators or heat sinks to contribute to the heat evacuation.

Motor chamber 40 can have one or more air inlet openings 41 for letting air 2a into chamber 40 and one or more air outlet openings 42 for letting air 2b out of chamber 40 when movable members 50 are driven by motor 30. For instance, openings 41 are located on a machine external bottom face 40' and/or machine external side face(s) 40".

At least one of the air circulation member(s) 50 may be formed as a wing, blade or vane.

At least one of the air circulation member(s) 50 may have:
a generally arched or curved shape, such as the general shape of an angular section of a cylindrical, conical, spherical, elliptoidal, helicoidal shape; and/or
a generally straight shape formed of a single planar section or a plurality of angled planar sections, optionally at least one planar section(s), e.g. all planar sections, having a (non-zero) angle relative to a direction of motion of the circulation member.

Air circulation member(s) 50 can be mounted on an axle 31 driven by motor 30, such as on a motor's output shaft or an axle driven thereby. The axle may be driven via a transmission by the output shaft such as via a gear transmission e.g. a toothed gear transmission.

As illustrated in the example shown in FIG. 1, a plurality of air circulation members 50 can be mounted in a loop, e.g. in a circle, such as on a ring or a disc 51, about a rotation axis 31'. For instance, members 50 are generally evenly distributed along the loop.

Motor chamber 40 may have a centrally located axis 31' and peripheral sidewall(s) 45, the circulation member(s) 50 being driven by motor 30 in motor chamber 40 about centrally located axis 31', between centrally located axis 31' and sidewall(s) 45, such as at a distance from centrally located axis 31' in the range of ¼ to ¾ of the spacing from centrally located axis 31' to sidewall 31' at the level of air circulation member 50, e.g. at a distance in the range of ⅓ to ⅔ of such spacing.

Motor 30 may drive a drive member 51, such as a coupling member having a general shape of a ring or a disc 51 and/or a coupling member bearing at least one of air circulation member(s) 50, for driving impeller 20 in container 10.

Drive member 51 can incorporate one or more magnetic elements 52 cooperating with magnetic elements 21 of impeller 20 so as to drive impeller 20 magnetically via a wall 11,12, such as a bottom wall 11 and/or a sidewall 12, of container 10. For instance, magnetic members 52 drive impeller 20 via a wall 43,44 of chamber 40, such as a platform wall 43 and/or a sidewall 44.

At least one element 52 of drive member 51 can be:
a magnetic field-generating element that is arranged to be magnetically coupled to a corresponding ferromagnetic element 21 of impeller 20;
a ferromagnetic element that is arranged to be magnetically coupled to a corresponding magnetic field-generating element 21 of impeller 20; or
a magnetic field-generating element that is arranged to be magnetically coupled to a corresponding magnetic field-generating element 21 of impeller 20.

Such magnetic field-generating element(s) may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Such ferromagnetic element(s) can be made of at least one of Co, Fe, $Fe_2O_3$, $FeOFe_2O_3$, $NiOFe_2O_3$, $CuOFe_2O_3$, $MgO\ Fe_2O_3$, $Nd_2Fe_{14}B$, Mn, Bi, Ni, MnSb, $MnOFe_2O_3$, $Y_3FesO_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCos$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

Machine 1 may include a base 4, e.g. an electrically connected base such as a base connected electrically to the mains via an electric cord, and a receptacle 10a that contains the container 10, e.g. a receptacle 10a having a handle 15. Receptacle 10a may be connectable to base 4 for processing the liquid food substance and separable from base 4 for dispensing the food substance upon processing and/or for cleaning receptacle 10a.

Base 4 may contain motor chamber 40.

Receptacle 10a can be made of passive components 10, base 4 comprising the active components, such as motor 30, a control unit 35 and/or a thermal conditioner 36, typically a heater and/or a cooler, e.g. a radiant or inductive thermal conditioner 36.

For example, base 4 forms a nest for receiving receptacle 10a.

Impeller 20 may have a surface 20' for imparting a mechanical effect to the liquid food substance, such as for mixing it with another fluid, e.g. air.

Impeller 20 can include a foot 23 for connection to motor 30, e.g. via magnetic elements 21 in foot 23.

Impeller 20 may have an axle 24 extending towards a mouth 10" of container 10 when impeller 20 is driven by motor 30, e.g. an axle 24 extending to the level of mouth 10", such as an axle 24 that is seizable by a user for removing impeller 20 from container 10.

The invention claimed is:

1. A machine for processing a liquid food substance, the machine comprising:
a container defining a cavity configured for containing the liquid food substance;
an impeller configured for driving the liquid food substance in the container;
a motor configured for driving the impeller;
a motor chamber configured for containing the motor and comprising a thermal conditioner configured for maintaining a temperature in the container; and
a member configured for evacuating heat from the motor chamber;
the member comprises one or more movable members that are driven by the motor and are configured to circulate air in the motor chamber to evacuate the heat therefrom;
the motor chamber has at least one opening configured for an exchange of air driven by the one or more movable members between the motor chamber and a space outside the motor chamber;
the member is configured so that a ratio of the heat evacuated by the at least one air opening over the heat evacuated by the cavity is greater than 2.5; and the at least one opening includes one or more air inlet openings configured for letting air into the motor chamber and one or more air outlet openings configured for letting air out of the motor chamber when the one or more movable members are driven by the motor, wherein the one or more air inlet openings and the one or more outlet openings are located on a machine external bottom face or a machine external side face.

2. The machine of claim 1, wherein at least one of the one or more movable members are formed as a wing, blade or vane.

3. The machine of claim 1, wherein at least one of the one or more movable members has:

a generally arched or curved shape; and/or a generally straight shape formed of a single planar section or a plurality of angled planar sections.

4. The machine of claim 1, wherein the one or more movable members are mounted on an axle driven by the motor.

5. The machine of claim 1, wherein the one or more movable members are mounted in a loop.

6. The machine of claim 1, wherein the motor chamber has a generally centrally located axis and a peripheral sidewall, the one or more movable members being driven by the motor in the motor chamber about the generally centrally located axis, between the generally centrally located axis and the peripheral sidewall.

7. The machine of claim 1, wherein the motor drives a drive member.

8. The machine of claim 7, wherein the drive member incorporates one or more magnetic elements cooperating with magnetic elements of the impeller so as to drive the impeller magnetically via a wall.

9. The machine of claim 8, wherein:

at least one magnetic element of the drive member is a magnetic field-generating element configured to be magnetically coupled to a corresponding ferromagnetic element of the impeller;

at least one magnetic element of the drive member is a ferromagnetic element configured to be magnetically coupled to a corresponding magnetic field-generating element of the impeller; or at least one magnetic element of the drive member is a magnetic field-generating element configured to be magnetically coupled to a corresponding magnetic field-generating element of the impeller.

10. The machine of claim 1, comprising:

a base; and a receptacle configured for containing the container.

11. The machine of claim 10, wherein the base contains the motor chamber.

12. The machine of claim 10, wherein the receptacle comprises passive components, and wherein the base comprises active components.

13. The machine of claim 1, wherein the impeller comprises one or more of:

a surface configured for imparting a mechanical effect to the liquid food substance;

a foot configured for being connected to the motor; and an axle extending towards a mouth of the container when the impeller is driven by the motor.

14. The machine of claim 8, wherein the one or more magnetic elements are provided in a platform wall or a sidewall of the motor chamber.

15. The machine of claim 14, wherein the magnetic elements of the impeller are provided in a bottom wall or a sidewall of the container.

16. The machine of claim 1, wherein the thermal conditioner comprises a heater or a cooler.

* * * * *

UNITED STATES PATENT AND TRADEMARK OFFICE
CERTIFICATE OF CORRECTION

PATENT NO. : 11,678,772 B2  
APPLICATION NO. : 16/462713  
DATED : June 20, 2023  
INVENTOR(S) : Heinz Dercar et al.

Page 1 of 1

It is certified that error appears in the above-identified patent and that said Letters Patent is hereby corrected as shown below:

On the Title Page

Column 1, item (71), Please change the applicant name from "NESTEC S.A." to "SOCIÉTÉ DES PRODUITS NESTLÉ S.A."

Signed and Sealed this  
Fifteenth Day of August, 2023

Katherine Kelly Vidal  
*Director of the United States Patent and Trademark Office*